(12) United States Patent
Gomez Minano et al.

(10) Patent No.: US 11,057,542 B2
(45) Date of Patent: Jul. 6, 2021

(54) COLOR CALIBRATION

(71) Applicant: HEWLETT-PACKARD DEVELOPMENT COMPANY, L.P., Spring, TX (US)

(72) Inventors: Hector Gomez Minano, Sant Cugat del Valles (ES); Peter Morovic, Sant Cugat del Valles (ES); Jan Morovic, London (GB)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/478,095

(22) PCT Filed: Apr. 26, 2017

(86) PCT No.: PCT/US2017/029599
§ 371 (c)(1),
(2) Date: Jul. 15, 2019

(87) PCT Pub. No.: WO2018/199937
PCT Pub. Date: Nov. 1, 2018

(65) Prior Publication Data
US 2019/0373138 A1 Dec. 5, 2019

(51) Int. Cl.
H04N 1/60 (2006.01)
B41J 2/12 (2006.01)
(Continued)

(52) U.S. Cl.
CPC ............. *H04N 1/6008* (2013.01); *B41J 2/12* (2013.01); *B41J 2/525* (2013.01); *G01J 3/462* (2013.01)

(58) Field of Classification Search
CPC .. H04N 1/6055; H04N 1/6008; H04N 1/6019; H04N 1/6066; B41J 2/12; B41J 2/525; G01J 3/462; G01J 3/46
See application file for complete search history.

(56) References Cited

U.S. PATENT DOCUMENTS 5,416,613 A 5/1995 Rolleston et al.
7,307,752 B1 12/2007 Mestha
(Continued)

FOREIGN PATENT DOCUMENTS

WO WO-2003103285 A1 12/2003

OTHER PUBLICATIONS

Heinz, M. et al, Dense Sampling of 3D Color Transfer Functions Using HDR Photography, 2015, < http://www.cv-foundation.org/openaccess/content_cvpr_workshops_2015/W10/papers/Heinz_Dense_Sampling_of_2015_CVPR_paper.pdf > (8 pages).

*Primary Examiner* — Jannelle M Lebron
(74) *Attorney, Agent, or Firm* — HP Inc. Patent Department

(57) ABSTRACT

Certain examples described herein relate to color calibration. In certain cases, a plurality of test patches are printed with a printing system, the test patches corresponding to a set of initial color sample points and a set of test colors. Color properties of the printed test patches are measured. In certain examples, a gamut descriptor is identified from a plurality of gamut descriptors using the color properties of the test colors. Each gamut descriptor defines a set of up-sampling parameters for a particular color gamut. Measured color properties for the initial color sample points are up-sampled using the set of up-sampling parameters for the identified gamut descriptor to generate up-sampled data. In certain cases, the up-sampled data is used to generate a color mapping to be applied to print job data received by the printing system.

20 Claims, 5 Drawing Sheets

(51) Int. Cl.
*B41J 2/525* (2006.01)
*G01J 3/46* (2006.01)

(56) References Cited

U.S. PATENT DOCUMENTS

| | | |
|---|---|---|
| 7,508,545 B2 | 3/2009 | Ng et al. |
| 8,094,318 B2 | 1/2012 | Han et al. |
| 9,292,729 B2 | 3/2016 | Guthrie et al. |
| 2003/0038798 A1 | 2/2003 | Besl et al. |
| 2008/0239418 A1* | 10/2008 | Brothers .............. H04N 1/6052 358/518 |

* cited by examiner

COLOR CALIBRATION

BACKGROUND

A printing system may include a plurality of different color printing fluids or colorants. By overprinting images for each of the printing fluids or colorants, an image with a range of different colors can be printed. An example printing pipeline may be calibrated so that printed colors are similar to or match desired colors, such as those defined in a digital format. However, certain calibration methods may not be sufficiently reliable and/or accurate. The printed image may therefore be a different color than desired.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

Figure 1:
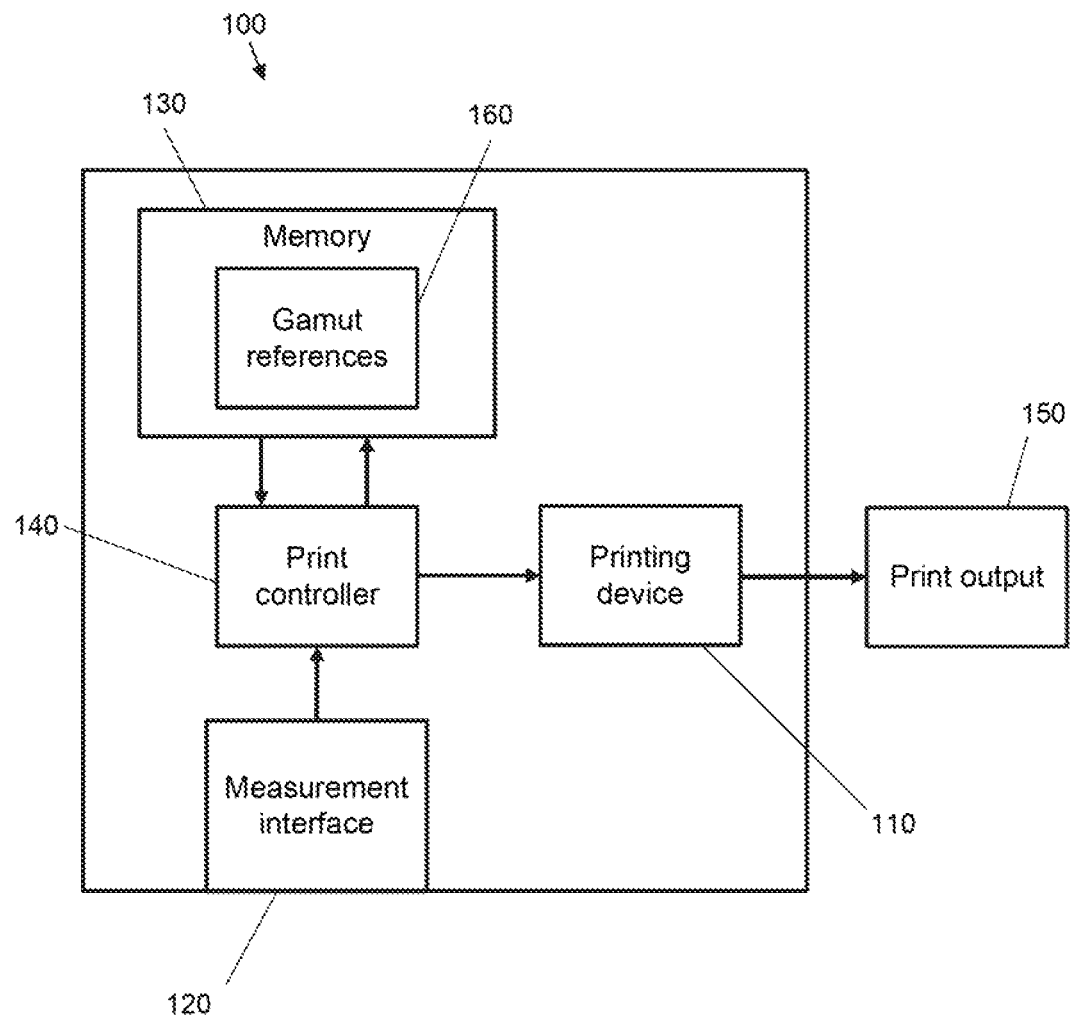
FIG. 1 is a schematic diagram of a printing system according to an example.

Certain examples described herein relate to color calibration. Color calibration of a printing system may, for example, adjust the color response of the printing system, such that an output of the printing system may more accurately correspond to a desired color to be printed. Color calibration may involve a color mapping process by which a first representation of a given color is mapped to a second representation of the same color.

Although "color" is a concept that is understood intuitively by human beings, it can be represented within print and display devices in a large variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of one or more people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant or printing fluid, e.g. for a printing system; the International Commission on Illumination (CIE) 1931 XYZ color space, in which three variables ('X', 'Y' and 'Z' or tristimulus values) are used to model a color; the CIE 1976 (L*, a*, b*-CIELAB or 'LAB') color space, in which three variables represent lightness ('L') and opposing color dimensions ('a' and 'b'); and the Yu'v' color space, in which three variables represent the luminance ('Y') and two chrominance dimensions (u' and v').

Color calibration of a printing system may be performed on independent colorant channels separately, that is, performing one-dimensional correction on a colorant-by-colorant basis. While this method may produce an accurate calibration of the colorant channels themselves, it may not take color interaction into account. For example, colors for which two or more colorants or printing fluids are overprinted or combined may not be calibrated accurately. Calibration of colorant combinations may be uncontrolled when correction is performed on a colorant-by-colorant basis. Furthermore, some printing systems may be configured not to have independent colorant channels. Calibration on a colorant-by-colorant basis may therefore be inapplicable to such printing systems. An example of a printing system for which colorant-by-colorant calibration is inapplicable is a Halftone Area Neugebauer Separation (HANS) printing system.

As an alternative to performing calibration on a colorant-by-colorant basis, color calibration may be performed on print job data received by the printing system, before it is passed to a subsequent color separation stage. For example, color calibration may be performed in RGB space. RGB-RGB calibration may involve analyzing and correcting color points in the printer gamut, instead of individual colorant channels. Color calibration in RGB space may involve printing and color measuring a sequence of test patches, each test patch corresponding to a different color in RGB space. In order to accurately represent the gamut of the printer to be calibrated, a large number of test patches may be printed and color measured. For example, even for a relatively small number of points in each color dimension, a large number of test patches are printable, given that the color space is three dimensional; e.g. in one case $17^3=4913$ test patches may be printed for a given calibration operation. Printing and color measuring such a large number of test patches may be impractical, e.g. take a long time and consume resources such as print substrate and printing fluid.

Certain examples described herein enable color calibration based on a small number of printed test patches. This is possible via the use of gamut references or descriptors. The test patches include a number of colors that are used to identify a gamut reference or descriptor. The identified gamut reference or descriptor is then used to up-sample measurements from the printed test patches.

FIG. 1 shows a printing system 100 according to an example. Certain examples described herein may be implemented within the context of this printing system.

The printing system 100 may be a 2D printing system such as an inkjet or digital offset printer, or a 3D printing system, otherwise known as an additive manufacturing system. In the example of FIG. 1, the printing system 100 comprises a printing device 110, a measurement interface 120, a memory 130, and a print controller 140. The print controller 140 may be implemented using machine readable instructions and/or suitably programmed or configured hardware.

The printing device 110 is arranged to print a plurality of calibration areas onto a print substrate to produce a print output 150. The print output 150 may, for example, comprise colored printing fluids deposited on a substrate. The printing device 110 may comprise an inkjet deposit mechanism. In 2D printing systems, the substrate may be paper, fabric, plastic or any other suitable print medium.

In 3D printing systems, the print output 150 may be a 3D printed object. In such systems, the substrate may be a build material in the form of a powder bed comprising, for example, plastic, metallic, or ceramic particles. Chemical agents, referred to herein as "printing agents", may be selectively deposited onto a layer of build material. In one case, the printing agents may comprise a fusing agent and a detailing agent. In this case, the fusing agent is selectively applied to a layer in areas where particles of the build material are to fuse together, and the detailing agent is selectively applied where the fusing action is to be reduced or amplified. In some examples, colorants may be deposited on a white or blank powder to color the powder. In other examples, objects may be constructed from layers of fused colored powder. In these case, calibration areas may comprise areas formed from or within one or more layers of fused material.

The printed calibration areas may be otherwise referred to as "test patches" or "test areas". The printed calibration areas may be used to calibrate the printing system 100. The printed calibration areas correspond to a set of initial colors and a set of test colors. Both the set of initial colors and the set of test colors may be used in the calibration process, as described in more detail below. Each initial color in the set of initial colors may be different from every other initial color in the set of initial colors. For example, different initial colors may have different red, green and/or blue components. Each test color in the set of test colors may be different from every other test color in the set of test colors. For example, different test colors may have different red, green and/or blue components. In some examples, the set of test colors comprises different colors from the set of initial colors. For example, each initial color in the set of initial colors may be different from every test color. In some examples, a given initial color in the set of initial colors is the same as a given test color. In such examples, a printed calibration area corresponding to the given initial color or a printed calibration area corresponding to the given test color may not be printed, such that the same color is not printed more than once.

The set of initial colors may comprise a grid of (r, g, b) sample points, e.g. sample points in RGB space. Each (r, g, b) sample point may be otherwise referred to as a "node". An example number of initial colors in the set of initial colors is $5^3$ colors.

The measurement interface 120 is to receive an indication of measured color properties of the printed calibration areas. In an example, the measurement interface 120 comprises a physical connection. The physical connection may be, for example, a Universal Serial Bus (USB) and/or serial data connection to electrically couple a measurement device such as a spectrophotometer and/or colorimeter, wherein data values are transmitted using an appropriate communication protocol over the interface. The measurement interface 120 may comprise a wired or wireless interface. In an example, the measurement interface 120 comprises a user interface. The user interface may, for example, comprise graphical components such as form fields to receive measurement data, e.g. data output by a separate measurement device. In some examples, the measurement interface 120 is to receive input from a color measurement device, e.g. as applied to a printed calibration area. Examples of color measurement devices include, but are not limited to, spectrophotometers, spectrofluorometers, spectrocolorimeters, and tristimulus colorimeters. In an example, the color measurement device is comprised in the printing system 100. In another example, the color measurement device is separate from the printing system 100. The color measurement device may be communicatively coupled to the printing system 100, for example via the measurement interface 120. The measured color properties may comprise a set of colorimetric values, e.g. values in LAB color space.

The measurement interface 120 may transmit information regarding the indication of measured color properties to the print controller 140. The print controller 140 may store information regarding the measured color properties in the memory 130. In some examples, the print controller 140 may, as described below, generate and/or modify a color mapping based on the indication of measured color properties.

The memory 130 comprises a plurality of gamut references 160. A gamut reference may be otherwise referred to as a "gamut descriptor" or a "reference gamut". Each gamut reference comprises a grid of reference color sample points. The grid of reference color sample points may have a higher resolution than the set of initial color sample points. An example number of reference color sample points for each gamut descriptor is $17^3$ reference color sample points.

The plurality of gamut references 160 may be considered as a library of gamut references, with each entry in the library corresponding to a different gamut reference. The plurality of gamut references 160 may be pre-defined. For example, the plurality of gamut descriptors 160 may be generated, derived, received, loaded or otherwise obtained prior to the printing system 100 being calibrated. Each gamut descriptor may be obtained by printing and color measuring the grid of reference color sample points using a particular printing configuration. In an example, each gamut reference in the plurality of gamut references corresponds to a different print system configuration. This may comprise a "factory" print system configuration, i.e. a configuration measured under controlled conditions. For example, a first gamut reference may correspond to a first print system configuration and a second gamut reference may correspond to a second print system configuration. Different print system configurations may produce different color outputs. Examples of factors which may be varied in order to obtain different print system configurations include the particular print head, the printing fluid drop weight, the type of substrate, the type of printing fluid, etc. In an example, each of the gamut references has a greater sampling density than the set of initial colors. Each of the gamut references may therefore be seen as a relatively high resolution data set. Each gamut reference in the plurality of gamut references 160 comprises data to define a corresponding set of up-sampling parameters for a particular color gamut.

The print controller 140 is to identify a gamut reference from the plurality of gamut references 160. A gamut reference is identified on the basis of measured color properties of the test colors. The test colors may correspond to a predefined set of colors from the reference color sample points of the gamut references. The test colors may be colors from the reference color sample points that are determined to change the most between different gamut references. The number of test colors may be relatively small compared with the number of reference color sample points. An example number of test colors is 10 test colors. The measured color properties of the printed calibration areas for the set of test colors may be compared with the corresponding test colors of each of the gamut references in the plurality of gamut references. A gamut reference may be selected from the plurality of gamut references on the basis of the mean color difference between printed test colors and corresponding test colors of the gamut references. For example, the gamut reference having the smallest mean color difference across the set of test colors may be selected from the plurality of gamut references. Having the smallest mean color difference may indicate that the selected gamut reference most closely resembles the gamut of the printing system to be calibrated.

The print controller 140 is further configured to up-sample, using the set of up-sampling parameters for the identified gamut reference, measured color properties for the initial colors to derive up-sampled data. In some examples, the print controller 140 is to configure an up-sampling model using a radial basis function, the up-sampling model having parameters derived from the identified gamut reference and the measured color properties for the set of initial colors.

The print controller 140 is further configured to generate, using the up-sampled data, a color mapping. The color mapping is to be applied to print input data to calibrate the printing system 100. Applying the color mapping to print input data may be considered to form part of an image processing pipeline. An example image processing pipeline is described below with reference to FIG. 2.

Figure 2:
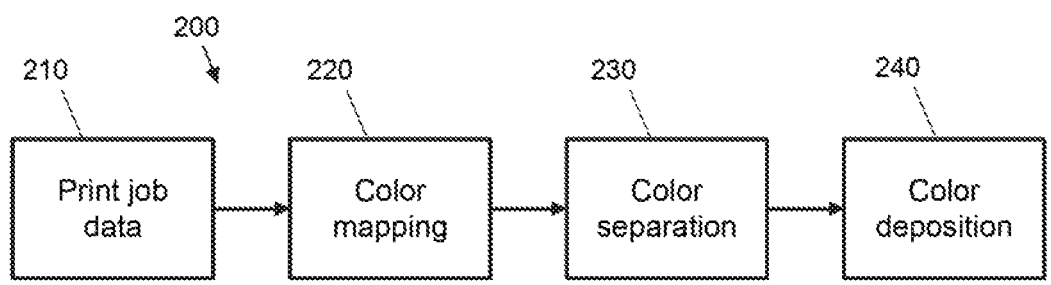
FIG. 2 is a schematic diagram of an image processing pipeline according to an example.

FIG. 2 shows an example of an image processing pipeline 200 for a printing system such as printing system 100 described with reference to FIG. 1. An image processing pipeline, otherwise referred to as an imaging pipeline, may be defined as a number of components that are used to process input image data from an image source for rendering by an image renderer, e.g. a printing device. These components may comprise hardware components or other machine readable components or instructions, such as image processing functions, digital signal processors, programmed Field Programmable Gate Arrays, Application-Specific Integrated Circuits and the like. Image processing functions may be applied in either machine readable instructions and/or suitably programmed or configured hardware to have the same effect.

The image processing pipeline 200 receives print job data 210. The print job data 210 may include color data defined within an input color space. The color space may be a device-dependent color space. For example, a color with a common value in the device-dependent color space may have a different perceived color when input to different printing systems. RGB and CMYK color spaces are examples of device-dependent color spaces. For example, where the input color data is defined within the RGB color space, the input color data may be in the form of pixel representations in the RGB color space respectively, e.g. such that each pixel of the image has a corresponding set of RGB values.

The print job data 210 is passed to a color mapping component 220. The color mapping component 220 may be a calibrated color mapping component 220. The color mapping component 220 is to apply a color mapping to the print job data 210. The color mapping to be applied by the color mapping component 220 is generated using up-sampled data derived by up-sampling measured color properties for a set of initial colors using a set of up-sampling parameters for an identified gamut reference, as described with reference to FIG. 1 above. The color mapping may be applied to the print job data 210 in the RGB color space. In an example, the color mapping component 220 maps the input color data from the input color space to an output color space. The output color space may be a device-dependent color space such as a RGB or CMYK color space. In an example, the output color space is a device-independent color space. The color mapping component 220 may comprise a color mapping look-up table. Mapping the print job data 210 may result in calibrated or mapped color data.

The calibrated color data is then passed to a color separation component 230, wherein each pixel is separated into different component colorants which are to be printed separately. The separated color data is then passed to a color deposition component 240 to deposit the component colorants onto a substrate.

In certain examples, the color separation stage 230 may instead perform a mapping to an area coverage color space such as a Neugebauer Primary area coverage (NPac) color space. This may be the case in a HANS printing system as discussed earlier. The color calibration described above is suitable for use with a HANS printing system, whereas comparative color calibration methods may lead to errors at the color separation stage in such a system. An NPac vector in the NPac color space represents a statistical distribution of one or more Neugebauer Primary vectors over an area of a halftone. In a simple binary (bi-level, i.e. two drop states: "drop" or "no drop") printer, a Neugebauer Primary is one of $2^k$ combinations of k printing fluids within the printing system. For example, if a printing device uses CMY printing fluids there can be eight Neugebauer Primaries. These Neugebauer Primaries relate to the following: C, M, Y, C+M, C+Y, M+Y, C+M+Y, and W (white or blank indicating an absence of printing fluid). A Neugebauer Primary may comprise an overprint of two available printing fluids, such as a drop of Magenta on a drop of Cyan (for a bi-level printer) in a common addressable print area (e.g. a printable "pixel"). Other examples may also incorporate multi-level printers, e.g. where print heads are able to deposit N drop levels; in this case an Neugebauer Primary may include one of $N^k$ combinations of k printing fluids within the printing system.

Each NPac vector in this case may therefore define the probability distribution for one or more colorant or printing fluid combinations for each pixel in the halftone (e.g. a likelihood that a particular colorant or printing fluid combination is to be placed at each pixel location in the halftone). This may be applied at stage 230 instead of separation into images in each of the CMYK color spaces, for example. In this manner, a given NPac vector defines a set of halftone parameters that can be used in the halftoning process to map a color to one or more NPac vectors to be statistically distributed over the plurality of pixels for a halftone. The statistical distribution of Neugebauer Primaries to pixels in the halftone serves to control the colorimetry and other print characteristics of the halftone. Spatial distribution of the Neugebauer Primaries according to the probability distribution specified in the NPac vector may be performed using any suitable halftoning methods, including matrix-selector-based Parallel Random Area Weighted Area Coverage Selection (PARAWACS) techniques and techniques based on error diffusion.

The printing system 100 described with reference to FIG. 1 may be configured to operate in accordance with an image processing pipeline comprising a color separation stage, such as image processing pipeline 200. In such examples, a color mapping is to be applied to print input data prior to the color separation stage.

Figure 3:
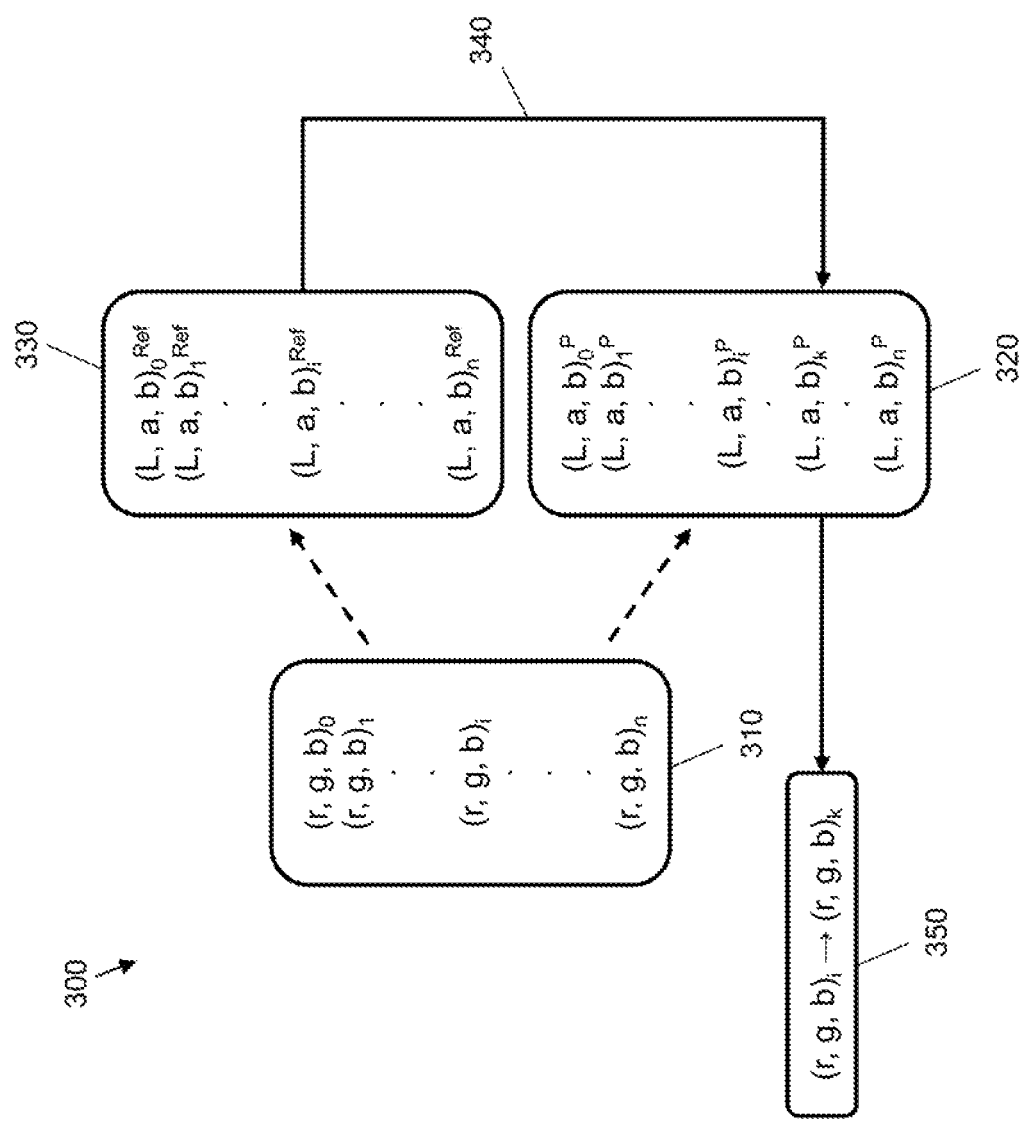
FIG. 3 is a schematic diagram of a workflow for generating a color mapping according to an example.

FIG. 3 shows a workflow 300 for generating a color mapping according to an example. The workflow 300 may be implemented by the print controller 140. The color mapping may be generated as part of a printer calibration process. The generated color mapping may be applied to print job data received by a printing system such as printing system 100.

In the workflow 300, a set of RGB color data 310 is obtained. The set of RGB color data 310 is represented in a RGB color space by a set of $(r, g, b)_i$ nodes, where $i \in \{0, \ldots, n\}$.

The set of RGB color data 310 has a corresponding set of colorimetric data 320, comprising a number of $(L, a, b)_i^P$ values for the printer to be calibrated. Each RGB node has a corresponding colorimetric value in the set of colorimetric data 320. In other words, $P(r, g, b)_i = (L, a, b)_i^P$, where P represents the gamut of the printer to be calibrated. The set of colorimetric data 320 may therefore be considered to represent the gamut of the printer to be calibrated, i.e. the actual colors printed by the printer. In an example, the set of colorimetric data 320 corresponds to up-sampled data as described herein. In other words, the set of colorimetric data 320 may be derived by up-sampling a relatively low resolution set of initial color sample points using up-sampling parameters associated with a gamut descriptor that is selected from a plurality of gamut descriptors.

A set of target colorimetric data 330 is also obtained. The set of target colorimetric data 330 may be considered to represent a gamut or printer that is to be used as a reference or target for calibration, that is, $Ref(r, g, b)_i = (L, a, b)_i^{Ref}$, where Ref denotes the gamut of a reference printer. Therefore, for every $(r, g, b)$ of a calibrated printer, $(r, g, b)_i = (L, a, b)_i^{Ref}$. The target gamut may be fully contained in the gamut of the printer to be calibrated, that is, the corresponding $(L, a, b)_i^{Ref}$ for any $(r, g, b)$, may be within the gamut of P.

A color mapping may be generated by determining which $(L, a, b)_k^P$ in the gamut of the printer to be calibrated is closest to each $(L, a, b)_k^{Ref}$ in the target gamut, where $k \in \{0, \ldots, n\}$. This determination is represented by arrow 340 in FIG. 3. Such a determination may be made using a CIELAB ΔE00 distance, that is, by minimizing the value $\Delta E00((L, a, b)_i^{Ref}, (L, a, b)_k^P)$.

In some examples, the determination of which $(L, a, b)_k^P$ is closest to each $(L, a, b)_i^{Ref}$ is made by building a tetrahedral tessellation, in RGB space, of the RGB cube respecting the direction of the neutral axis, that is, by tessellating sub-cubes of the RGB cube such that the long diagonal of the sub-cube that is aligned with the white to black axis is contained in each tessellating tetrahedron. This tessellation may then be mapped to colorimetric space via the correspondence between $(r, g, b)$ nodes and $(L, a, b)$ colorimetric values. In this example, searching for the $(L, a, b)_k^P$ that is closest to $(L, a, b)_i^{Ref}$ will not produce a point in the gamut of the printer to be calibrated, but instead will produce a tetrahedron that contains both $(L, a, b)_k^P$ and the corresponding barycentric coordinates of $(L, a, b)_i^{Ref}$ with respect to the corners of the tetrahedron that form a base.

The resulting information may be mapped back to RGB space to obtain the desired $(r, g, b)_k$.

The above process produces a mapping 350 to be applied in the RGB color space, that is, $(r, g, b)_i \rightarrow (r, g, b)_k$. In other words, for a given $(r, g, b)_i$, $P(r, g, b)_i \rightarrow P(r, g, b)_k \cong (L, a, b)_i^{Ref}$. Such a mapping, once obtained for every $(r, g, b)_i$ node in the set of RGB color data 310, may be applied to device RGB data prior to printing, thereby color calibrating the printer. The mapping thus maps the color output of the printer to a desired color output for the printer.

Figure 4:
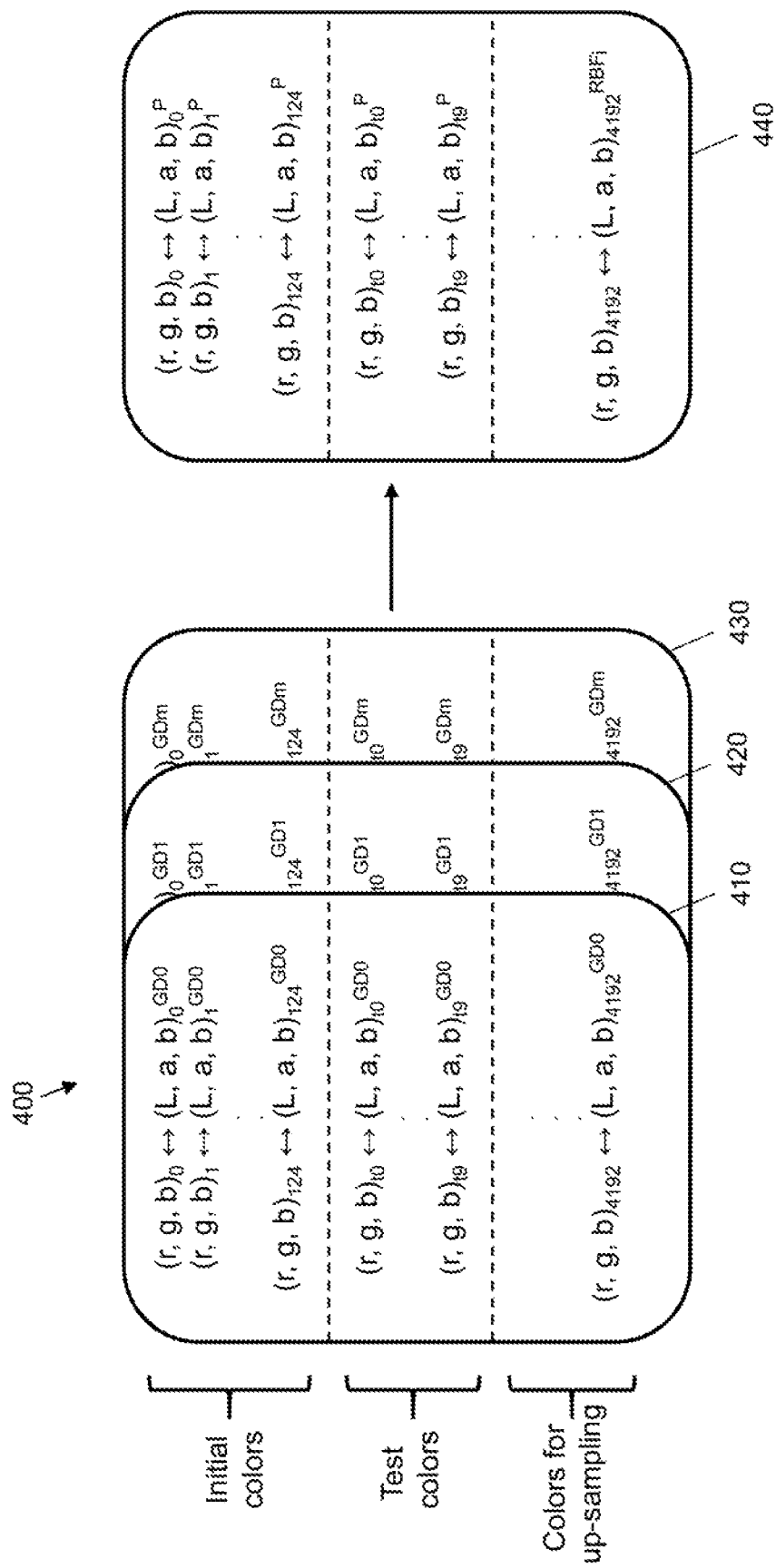
FIG. 4 is a schematic diagram of a plurality of gamut descriptors according to an example.

FIG. 4 shows a plurality 400 of gamut descriptors according to an example. The plurality 400 of gamut descriptors may be stored in a memory of a printing system, such as memory 130 of printing system 100. The plurality 400 of gamut descriptors may be considered to form a library, each entry in the library corresponding to a different gamut descriptor. Each gamut descriptor may correspond to a particular color gamut. In some examples, different gamut descriptors are associated with a different printing system configuration. The plurality 400 of gamut descriptors may be used to facilitate an up-sampling operation performed on measured color properties for a set of initial color nodes.

The plurality 400 of gamut descriptors comprises m+1 gamut descriptors. In the example shown in FIG. 4, three gamut descriptors 410, 420, 430 from the plurality 400 are shown, although many more gamut descriptors may be used in some examples. Each gamut descriptor comprises data that maps RGB color nodes to colorimetric values, e.g. (L, a, b) values. Colorimetric values for one gamut descriptor, e.g. gamut descriptor 410, may differ from corresponding colorimetric values for another gamut descriptor, e.g. gamut descriptor 420. For example, $(L, a, b)_0^{GD0}$ may be different from $(L, a, b)_0^{GD1}$, despite both colorimetric values being associated with the same RGB node, namely $(r, g, b)_0$. The mapping of RGB nodes to colorimetric values for a given gamut descriptor may be obtained by printing and color measuring patches corresponding to the different RGB nodes.

Each gamut descriptor comprises a mapping of RGB nodes to colorimetric values for a relatively low resolution sequence of RGB nodes that are to be printed as a set of initial color sample points using a printer to be calibrated, e.g. for $(r, g, b)_0$ to $(r, g, b)_{124}$. Each gamut descriptor also comprises a mapping of RGB nodes to colorimetric values for a set of test colors, e.g. for $(r, g, b)_{t0}$ to $(r, g, b)_{t9}$. The test colors may correspond to colors that are determined to vary the most between different gamut descriptors. The test colors may be used to select a gamut descriptor from the plurality 400 of gamut descriptors. Each gamut descriptor may further comprise a mapping of RGB nodes to colorimetric values for a relatively high resolution sequence of RGB nodes, e.g. a sequence ending $(r, g, b)_{4912}$, that is to be used to guide an up-sampling operation on measured color data, as described in more detail below.

Each gamut descriptor in the plurality 400 defines a set of up-sampling parameters. The up-sampling parameters may be applied in an up-sampling operation to increase the resolution of a printed set of color samples representing the color gamut of a printer to be calibrated. In an example, a given gamut descriptor defines a set of up-sampling parameters directly, e.g. by storing the set of up-sampling parameters. In another example, a given gamut descriptor defines a set of up-sampling parameters indirectly. For example, each gamut descriptor may comprise data that is useable to generate the set of up-sampling parameters. The data useable to generate the set of up-sampling parameters may comprise the mapping of RGB nodes to colorimetric values for the relatively low resolution sequence of RGB nodes. In an example, the data useable to generate the set of up-sampling parameters comprises the mapping of RGB nodes to colorimetric values for the relatively high resolution sequence of RGB nodes. In an example, the up-sampling parameters relate to radial basis functions. For example, the up-sampling parameters may comprise weightings or interpolator centers to be applied in a radial basis function network.

A given gamut descriptor 440 may be identified from the plurality 400 of gamut descriptors. The given gamut descriptor 440 may be selected on the basis of the test colors. For example, the given gamut descriptor 440 may be selected from the plurality 400 of gamut descriptors on the basis of the mean color difference between printed test colors and corresponding test colors of each of the gamut descriptors. The given gamut descriptor 440 may be considered to represent the gamut of the printer to be calibrated more accurately than the other gamut descriptors in the plurality 400. The given gamut descriptor 440 is used to up-sample measured color properties for a set of initial color samples. For example, up-sampling parameters for the given gamut descriptor 440 may be used to guide an up-sampling operation on measured color properties for a set of initial color samples printed by a printer to be calibrated.

In some examples, the given gamut descriptor 440 has an associated radial basis function, $RBF_i$. The radial basis function associated with the given gamut descriptor 440 may be used to facilitate an upscaling of relatively low resolution color data printed by a printer to be calibrated. The upscaled color data may be used to generate a color mapping to be applied to print job data to calibrate the printer.

Figure 5:
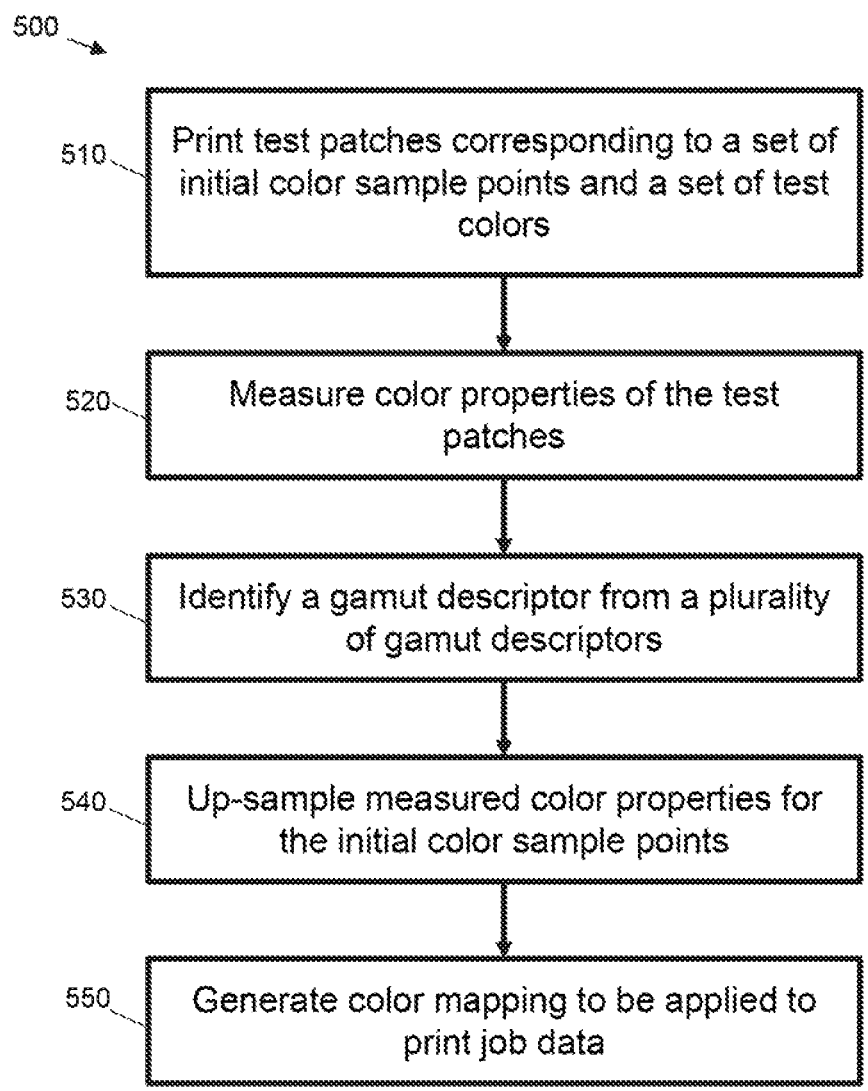
FIG. 5 is a flow chart illustrating a method for calibrating a printing system according to an example.

FIG. 5 shows a method 500 of calibrating a printing system according to an example. In some examples, the method 500 is performed by a print controller such as print controller 140. The print controller may perform the method based on instructions retrieved from a computer-readable storage medium. The printing system may comprise printing system 100.

At item 510, a plurality of test patches are printed with the printing system. The test patches correspond to a set of initial color sample points and a set of test colors. In an example, 135 test patches are printed, corresponding to 125 initial color sample points and 10 test colors.

At item 520, color properties of the printed test patches are measured. Measured color properties may comprise, for example, colorimetric data obtained via a colorimetric device.

At item 530, a gamut descriptor is identified from a plurality of predefined gamut descriptors. The gamut descriptor is identified using the color properties of the test colors. Each gamut descriptor in the plurality of predefined gamut descriptors defines a set of up-sampling parameters for a particular color gamut. Up-sampling parameters may be parameters that are useable in an up-sampling operation, as described in more detail below. In an example, each gamut descriptor in the plurality of gamut descriptors is associated with a different printing system state.

In an example, an up-sampling model is configured using a radial basis function. The up-sampling model may have parameters derived from the identified gamut descriptor and the measured color properties for the initial color sample points. In an example, the up-sampling model is generated by the printing system.

In an example, the up-sampling model has the form: $f(x)=\Sigma_i(w_i\phi(|x-c_i|))$, where $\phi$ is a radial basis function, $w_i$ are weight coefficients and $c_i$ are interpolator centers. $w_i$ and/or $c_i$ may be based on the up-sampling parameters for the identified gamut descriptor. The up-sampling model may therefore be considered as a radial basis function network, or a linear combination of radial basis functions. A radial basis function is a real-valued function whose value depends on a distance from an interpolator center, $c_i$. The interpolator centers, $c_i$, coincide with the grid of nodes of the measured color properties. Therefore, the up-sampling model has as an input the measured color properties for the initial color sample points. The radial basis functions have the form $f(r)=\exp(-r^2/r_0^2)$. The weight coefficients, $w_i$, weight the contributions of different radial basis functions in the up-sampling model for a given gamut descriptor. The weight coefficients, $w_i$, are calculated as the solution of the linear system to map the measured color properties of the initial color sample points to the corresponding values in the gamut descriptor. The up-sampling model therefore represents a link from the measured color properties for the initial color sample points to the given gamut descriptor. A respective up-sampling model may be configured for each gamut descriptor in the plurality of gamut descriptors for a given calibration operation.

At item 540, measured color properties for the initial color sample points are up-sampled to generate up-sampled data. The color properties for the initial color sample points are up-sampled using the set of up-sampling parameters for the identified gamut descriptor. In an example, the up-sampling model for the identified gamut descriptor is applied to the color properties for the initial color sample points. The identified gamut descriptor is therefore used to guide the up-sampling of the initial color sample points. The up-sampled data may comprise a set or grid of sample points describing the gamut of the printer to be calibrated. The up-sampled data has a higher sampling density or resolution than the set of initial color sample points. For example, in a case where there are $5^3=125$ initial color sample points, the up-sampled data may comprise $17^1=4913$ sample points.

At item 550, a color mapping is generated using the up-sampled data. In an example, the color mapping is generated using a tetrahedral tessellation of the up-sampled data, as described with reference to FIG. 3. The color mapping is to be applied to print job data received by the printing system.

In some examples, the printing system is configured to operate in accordance with an imaging pipeline comprising a color separation stage, such as imaging pipeline 200 described with reference to FIG. 2. In such examples, the generated color mapping is to be applied to the print job data prior to the color separation stage.

In some examples, the generated color mapping is applied to print job data to calibrate the printing system. The color mapping may be applied in a RGB color space.

In some examples, the generated color mapping follows a locally non-linear relationship. For example, within tessella of the up-sampled data, linearity may not be assumed. In an example, color transitions within tessella of the calibrated color data do not follow a locally-linear relationship.

Figure 6:
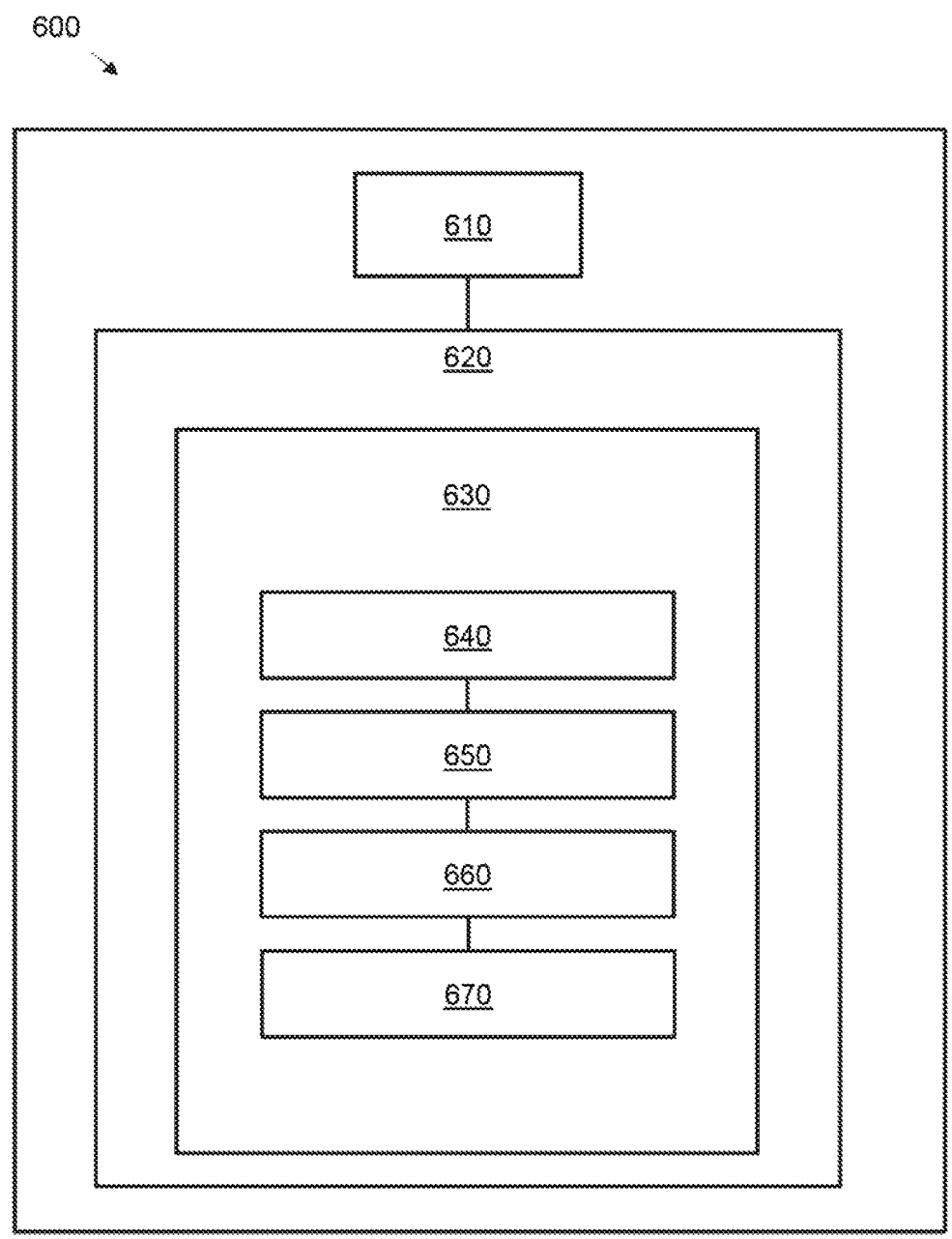
FIG. 6 is a schematic diagram of a processor and a computer readable storage medium with instructions stored thereon according to an example.

FIG. 6 shows example components of a printing system 600, which may be arranged to implement certain examples described herein. A processor 610 of the printing system 600 is connectably coupled to a computer-readable storage medium 620 comprising a set of computer-readable instructions 630 stored thereon, which may be executed by the processor 610. The printing system 600 may comprise a printing system similar to printing system 100.

Instruction 640 instructs the processor 610 to receive measured color data. The measured color data may be received, for example, from a color measuring device comprised in or communicatively coupled to the printing system 600. The measured color data indicates measured color properties of a plurality of printed patches. The printed patches correspond to a set of initial color nodes and a set of selection color nodes. Instruction 650 instructs the processor 610 to select, using the color properties of the selection color nodes, a gamut descriptor from a plurality of predefined gamut descriptors. Each gamut descriptor in the plurality of gamut descriptors defines a set of upscaling parameters associated with a particular color gamut. Instruction 660 instructs the processor 610 to upscale measured color properties for the initial color nodes using the set of upscaling parameters for the selected gamut descriptor. Upscaling the measured color properties for the initial color nodes generates upscaled data. Instruction 670 then instructs the processor 610 to generate, using the upscaled data, a calibration look-up table to be used to color calibrate the printing system 600.

Processor 610 can include a microprocessor, microcontroller, processor module or subsystem, programmable integrated circuit, programmable gate array, or another control or computing device. The computer-readable storage medium 620 can be implemented as one or multiple computer-readable storage media. The computer-readable storage medium 620 includes different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. The computer-readable instructions 630 can be stored on one computer-readable storage medium, or alternatively, can be stored on multiple computer-readable storage media. The computer-readable storage medium 620 or media can be located either in the printing system 600 or located at a remote site from which computer-readable instructions can be downloaded over a network for execution by the processor 610.

Certain examples described herein enable a reduction in the number of test patches to be printed and color measured for a given printer calibration. A relatively small number of test patches may be printed and color measured. The measured color properties of the relatively small number of test patches may be up-sampled using a gamut descriptor having a set of up-sampling parameters. The resulting up-sampled data may be used instead of or in addition to the measured color properties of the relatively small number of test patches to generate a color mapping for calibrating the printer. By reducing the number of test patches to be printed and color measured, the calibration process may be made more efficient. For example, the time to calibrate a given printer may be reduced. Additionally or alternatively, by reducing the number of test patches to be printed and color measured, fewer resources may be used, such as printing fluid or substrate, thereby reducing wastage and/or cost.

Certain examples described herein involve identifying a gamut descriptor from a plurality of gamut descriptors. Each gamut descriptor may be associated with a particular print configuration. By identifying a given gamut descriptor and using the up-sampling parameters associated with the identified gamut descriptor to up-sample measured color data for a set of initial color sample points, the gamut of the printer to be calibrated may be represented accurately and with a high resolution even when different print configurations are used.

Certain examples described herein enable color calibration of a printing device to be performed in the device RGB space. Performing color calibration in the RGB space may be more accurate than a calibration of independent colorant channels. Additionally or alternatively, a greater number of colors may be accurately calibrated when calibration is performed in the RGB space compared with a case in which calibration is performed on independent colorant channels.

Certain examples described herein enable a printer to be calibrated more reliably. By up-sampling a set of measured color data using up-sampling parameters derived from one of a plurality of predefined gamut descriptors, the gamut of a printer to be calibrated may be represented accurately and at a high resolution. Representing the gamut of the printer to be calibrated with a high degree of accuracy improves the reliability of the resulting color mapping. By improving the reliability of the color mapping used to calibrate the printer, colors printed with the calibrated printer may more closely match desired colors.

The preceding description has been presented to illustrate and describe examples of the principles described. This description is not intended to be exhaustive or to limit these principles to any precise form disclosed. Many modifications and variations are possible in light of the above teaching.

What is claimed is:

1. A printing system comprising:
   a printing device to print a plurality of calibration areas onto a print substrate, the calibration areas corresponding to a set of initial colors and a set of test colors;
   a measurement interface to receive an indication of measured color properties of the printed calibration areas;
   a memory comprising a plurality of gamut references, each gamut reference of the plurality of gamut references comprising data to define a corresponding set of up-sampling parameters for a particular color gamut; and
   a print controller to:
      select a gamut reference from the plurality of gamut references based on measured color properties for the set of test colors;
      up-sample, using the set of up-sampling parameters for the selected gamut reference, measured color properties for the set of initial colors to derive up-sampled data; and
      generate, using the up-sampled data, a color mapping to be applied to print input data to calibrate the printing system.

2. The printing system of claim 1, wherein the printing system is to operate in accordance with an image processing pipeline comprising a color separation stage, and wherein the color mapping is to be applied to the print input data prior to the color separation stage.

3. The printing system of claim 1, wherein the color mapping is to be applied in an RGB color space.

4. The printing system of claim 1, wherein the plurality of gamut references correspond to different print system configurations.

5. The printing system of claim 1, wherein the selected gamut reference has a greater sampling density than the set of initial colors.

6. The printing system of claim 1, wherein the print controller is to:
configure an up-sampling model using a radial basis function, the up-sampling model having parameters derived from the selected gamut reference and the measured color properties for the set of initial colors, and
up-sample the measured color properties for the set of initial colors using the up-sampling model.

7. The printing system of claim 1, wherein the color mapping follows a locally non-linear relationship.

8. The printing system of claim 1, wherein the print controller comprises a processor and a non-transitory storage medium storing instructions executable on the processor to select the gamut reference from the plurality of gamut references based on comparing the measured color properties for the set of test colors with corresponding test colors in each gamut reference of the plurality of gamut references.

9. The printing system of claim 8, wherein the instructions are executable on the processor to select the gamut reference from the plurality of gamut references based on computing a color difference between the measured color properties for the set of test colors and corresponding test colors in each gamut reference of the plurality of gamut references.

10. The printing system of claim 1, wherein the set of test colors comprise colors that vary the most between different gamut references of the plurality of gamut references.

11. A method of calibrating a printing system, comprising:
printing, with the printing system, a plurality of test patches corresponding to a set of initial color sample points and a set of test colors;
measuring color properties of the printed plurality of test patches, the measured color properties comprising color properties for the set of initial color sample points and color properties for the set of test colors;
selecting, using the color properties for the set of test colors, a gamut descriptor from a plurality of predefined gamut descriptors, each gamut descriptor of the plurality of predefined gamut descriptors defining a set of up-sampling parameters for a particular color gamut;
up-sampling, using the set of up-sampling parameters of the selected gamut descriptor, the color properties for the set of initial color sample points to generate up-sampled data; and
generating, using the up-sampled data, a color mapping to be applied to print job data received by the printing system.

12. The method of claim 11, comprising configuring an up-sampling model using a radial basis function, the up-sampling model having parameters derived from the selected gamut descriptor and the color properties for the set of initial color sample points.

13. The method of claim 12,
wherein the up-sampling model has a form: $f(x)=\Sigma_i(w_i \phi(|x-c_i|))$, where $\phi$ is the radial basis function, $w_i$ are weight coefficients, and $c_1$ are interpolator centers, and
wherein $w_i$ and/or $c_1$ are based on the up-sampling parameters of the selected gamut descriptor.

14. The method of claim 11,
wherein the printing system operates in accordance with an imaging pipeline comprising a color separation stage, and
wherein the color mapping is applied to the print job data prior to the color separation stage.

15. The method of claim 11, wherein the plurality of predefined gamut descriptors are associated with different printing system states.

16. The method of claim 11, comprising generating the color mapping using a tetrahedral tessellation of the up-sampled data.

17. The method of claim 11, comprising applying the color mapping to the print job data to calibrate the printing system.

18. A non-transitory computer-readable storage medium comprising computer-readable instructions that upon execution cause a system comprising a processor to:
receive measured color data indicating measured color properties of a plurality of printed patches, the printed patches corresponding to a set of initial color nodes and a set of selection color nodes, the measured color properties comprising color properties for the set of initial color nodes and color properties for the set of selection color nodes;
select, using the color properties for the set of selection color nodes, a gamut descriptor from a plurality of predefined gamut descriptors, each gamut descriptor of the plurality of predefined gamut descriptors defining a set of upscaling parameters associated with a particular color gamut;
upscale, using the set of upscaling parameters of the selected gamut descriptor, the color properties for the set of initial color nodes to generate upscaled data; and
generate, using the upscaled data, a calibration look-up table to be used to color calibrate a printing system.

19. The non-transitory computer-readable storage medium of claim 18, wherein the computer-readable instructions upon execution cause the system to:
configure an up-sampling model using a radial basis function, the up-sampling model having parameters derived from the selected gamut descriptor and the color properties for the set of initial color nodes; and
upscale the color properties for the set of initial color nodes using the up-sampling model.

20. The non-transitory computer-readable storage medium of claim 18, wherein the computer-readable instructions upon execution cause the system to:
select the gamut descriptor from the plurality of predefined gamut descriptors based on comparing the color properties for the set of selection color nodes with corresponding selection color nodes in each gamut descriptor of the plurality of predefined gamut descriptors.

* * * * *